United States Patent
Nakayama et al.

(10) Patent No.: US 11,561,279 B2
(45) Date of Patent: Jan. 24, 2023

(54) RADAR ESTIMATING METHOD, DEVICE AND MEDIUM TO EXTRACT LIVING BODY VECTOR INFORMATION

(71) Applicant: PANASONIC INTELLECTUAL PROPERTY MANAGEMENT CO., LTD., Osaka (JP)

(72) Inventors: Takeshi Nakayama, Hyogo (JP); Shoichi Iizuka, Osaka (JP); Naoki Honma, Iwate (JP); Nobuyuki Shiraki, Iwate (JP); Abudusaimi Abuduaini, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 380 days.

(21) Appl. No.: 16/707,323

(22) Filed: Dec. 9, 2019

(65) Prior Publication Data
US 2020/0209351 A1 Jul. 2, 2020

(30) Foreign Application Priority Data

Dec. 28, 2018 (JP) .............................. JP2018-247386
Aug. 26, 2019 (JP) .............................. JP2019-153396

(51) Int. Cl.
*G01S 7/35* (2006.01)
*G01S 13/42* (2006.01)
(Continued)

(52) U.S. Cl.
CPC .............. *G01S 7/352* (2013.01); *G01S 7/415* (2013.01); *G01S 13/284* (2013.01); *G01S 13/42* (2013.01); *G01S 7/358* (2021.05)

(58) Field of Classification Search
CPC ........ G01S 7/352; G01S 7/415; G01S 13/284; G01S 13/42; G01S 7/358; G01S 13/06; G01S 7/411; G01S 13/88
See application file for complete search history.

(56) References Cited

U.S. PATENT DOCUMENTS

| | | | |
|---|---|---|---|
| 10,241,187 B2 | 3/2019 | Honma et al. | |
| 2016/0084950 A1* | 3/2016 | Muller | G01S 13/58 342/36 |

(Continued)

FOREIGN PATENT DOCUMENTS

| | | | |
|---|---|---|---|
| JP | 2011-019845 A | 2/2011 | |
| JP | 2014-216786 A | 11/2014 | |

(Continued)

*Primary Examiner* — Donald HB Braswell
(74) *Attorney, Agent, or Firm* — Greenblum & Bernstein, P.L.C.

(57) ABSTRACT

An estimating method includes: measuring and receiving reception signals including a reflected signal reflected by a moving body, for a first period equivalent to a cycle of movement of the moving body; calculating first complex transfer functions indicating propagation characteristics, from the reception signals measured in the first period; calculating second complex transfer functions having reduced components corresponding to fluctuations, from the first complex transfer functions; extracting moving body information corresponding to a component related to the moving body by extracting moving body information corresponding to a predetermined frequency range of the second complex transfer functions calculated; and estimating a direction in which the moving body is present using the moving body information.

16 Claims, 10 Drawing Sheets

(51) Int. Cl.
*G01S 7/41* (2006.01)
*G01S 13/28* (2006.01)

(56) References Cited

U.S. PATENT DOCUMENTS

| | | | |
|---|---|---|---|
| 2016/0174099 A1* | 6/2016 | Goldfain | A61B 5/6831 |
| | | | 375/130 |
| 2017/0184699 A1* | 6/2017 | Honma | G01S 3/74 |
| 2017/0205502 A1 | 7/2017 | Honma et al. | |
| 2018/0074169 A1* | 3/2018 | Ray | G01S 7/2923 |
| 2019/0195997 A1 | 6/2019 | Iizuka et al. | |
| 2019/0369233 A1* | 12/2019 | Niesen | G01S 13/5244 |
| 2020/0166622 A1* | 5/2020 | Small | G01S 13/4445 |

FOREIGN PATENT DOCUMENTS

| | | |
|---|---|---|
| JP | 2015-072173 A | 4/2015 |
| JP | 2017-005655 A | 1/2017 |
| JP | 2017-129558 A | 7/2017 |
| JP | 2019-117055 A | 7/2019 |

\* cited by examiner

FIG. 8

| ANTENNA ELEMENT (Tx/Rx) | 4 BY 4 PATCH ANTENNAS |
|---|---|
| HEIGHT OF ANTENNA | 1.0 m |
| DISTANCE BETWEEN Tx AND Rx | 4.0 m |
| ELEMENT SPACING (Tx/Rx) | 0.5 λ |
| FREQUENCY | 2.47125 GHz |
| CHANNEL MEASUREMENT TIME $t$ | 33 s |
| ROOM SIZE | 4 m × 4 m |
| NUMBER OF TARGETS | 1 |
| NUMBER OF MEASUREMENT POINTS | 81 POINTS |
| TYPE OF EXPERIMENT | SYNCHRONIZED, UNSYNCHRONIZED |

RADAR ESTIMATING METHOD, DEVICE AND MEDIUM TO EXTRACT LIVING BODY VECTOR INFORMATION

CROSS REFERENCE TO RELATED APPLICATION

This application claims the benefit of priority of Japanese Patent Application Number 2018-247386 filed on Dec. 28, 2018 and Japanese Patent Application Number 2019-153396 filed on Aug. 26, 2019, the entire contents of which are hereby incorporated by reference.

BACKGROUND

1. Technical Field

The present disclosure relates to an estimating method and an estimating device for estimating a direction or a position of a moving body by using radio signals.

2. Description of the Related Art

Japanese Unexamined Patent Application Publication No. 2015-72173 (Patent Literature 1 (PTL 1)) and Japanese Unexamined Patent Application Publication No. 2017-129558 (PTL 2) disclose methods that use radio signals as methods for knowing the position of a person. PTL 1 discloses a method for knowing the position of a person that is a detection target, by using the frequency response of complex transfer functions of a radio transceiver. Furthermore, PTL 2 discloses a method for knowing the position or state of a person that is a detection target, by using difference information of two complex transfer functions of two time points having a predetermined interval among complex transfer functions of a radio transceiver.

Furthermore, Japanese Unexamined Patent Application Publication No. 2014-216786 (PTL 3) discloses a method of performing timing correction between sensors through timer correction commands. Japanese Unexamined Patent Application Publication No. 2011-019845 (PTL 4) discloses a method of measuring the degree of fatigue based on the statistical results of two sensors.

SUMMARY

However, in the techniques in PTL 1 to PTL 4, accurately estimating the direction or position of a living body relative to the estimating device is difficult.

The present disclosure provides an estimating method, etc., capable of accurately estimating the direction or position of a moving body including a living body relative to the estimating device.

An estimating method according to an aspect of the present disclosure is an estimating method for use in an estimating device that includes an antenna unit including a transmission antenna element and N reception antenna elements, where N is a natural number greater than or equal to two, the estimating method including: transmitting a transmission signal to a measurement target area using the transmission antenna element; measuring, for a first period equivalent to a cycle of movement by a moving body, reception signals which are received by each of the N reception antenna elements and include a reflected signal which is the transmission signal transmitted from the transmission antenna element that has been reflected by the moving body; calculating first complex transfer functions using the reception signals measured in the first period, the first complex transfer functions each indicating a propagation characteristic between the transmission antenna element and one of the N reception antenna elements; calculating second complex transfer functions from the first complex transfer functions by performing a predetermined arithmetic operation using one or more elements of the first complex transfer functions, the second complex transfer functions having reduced components corresponding to at least one of (1) clock fluctuation between (i) a transmission unit that generates the transmission signal transmitted from a transmission antenna unit and (ii) a reception unit; and (2) timing fluctuation in digital-to-analog conversion of the transmission signal or analog-to-digital conversion of the reception signals; extracting moving body information corresponding to a component related to the moving body by extracting the moving body information corresponding to a predetermined frequency range of the second complex transfer functions calculated; and estimating a direction in which the moving body is present relative to the estimating device, according to a predetermined arrival direction estimating method and using the moving body information.

Furthermore, an estimating method according to another aspect of the present disclosure is an estimating method for use in an estimating device that includes a transmission antenna unit including M transmission antenna elements, and a reception antenna unit including N reception antenna elements, where M and N are each a natural number greater than or equal to two, the estimating method including: transmitting transmission signals to a measurement target area using the M transmission antenna elements; measuring, for a first period equivalent to a cycle of movement by a moving body, reception signals which are received by each of the N reception antenna elements and include reflected signals which are the transmission signals emitted from the M transmission antenna elements that have been reflected by the moving body; calculating first complex transfer functions using the reception signals measured in the first period, the first complex transfer functions each indicating a propagation characteristic between one of the M transmission antenna elements and one of the N reception antenna elements; calculating second complex transfer functions from the first complex transfer functions by performing a predetermined arithmetic operation using one or more elements of the first complex transfer functions, the second complex transfer functions having reduced components corresponding to at least one of (1) clock fluctuation between (i) a transmission unit that generates the transmission signals transmitted from the transmission antenna unit and (ii) a reception unit; and (2) timing fluctuation in digital-to-analog conversion of the transmission signals or analog-to-digital conversion of the reception signals; extracting moving body information corresponding to a predetermined frequency range of the second complex transfer functions calculated, to extract the moving body information corresponding to a component related to the moving body; and estimating a position in which the moving body is present relative to the estimating device, according to a predetermined arrival direction estimating method and using the moving body information.

Furthermore, an estimating device according to an aspect of the present disclosure includes: an antenna unit including a transmission antenna element and N reception antenna elements, where N is a natural number greater than or equal to two; a transmission unit that transmits a transmission signal to a measurement target area using the transmission antenna element; a reception unit that measures, for a first period equivalent to a cycle of movement by a moving body, reception signals which are received by each of the N reception antenna elements and include a reflected signal which is the transmission signal transmitted from the transmission antenna element that has been reflected by the moving body; a first complex transfer function calculator that calculates first complex transfer functions using the reception signals measured in the first period, the first complex transfer functions each indicating a propagation characteristic between the transmission antenna element and one of the N reception antenna elements; a second complex transfer function calculator that calculates second complex transfer functions from the first complex transfer functions by performing a predetermined arithmetic operation using one or more elements of the first complex transfer functions, the second complex transfer functions having reduced components corresponding to at least one of (1) clock fluctuation between (i) the transmission unit that generates the transmission signal transmitted from a transmission antenna unit and (ii) the reception unit; and (2) timing fluctuation in digital-to-analog conversion of the transmission signal or analog-to-digital conversion of the reception signals; a moving body information calculator that extracts moving body information corresponding to a component related to the moving body by extracting the moving body information corresponding to a predetermined frequency range of the second complex transfer functions calculated; and a direction estimation processor that estimates a direction in which the moving body is present relative to the estimating device, according to a predetermined arrival direction estimating method and using the moving body information.

It should be noted that these generic and specific aspects may be implemented using a system, a method, an integrated circuit, a computer program, or a computer-readable recording medium such as a CD-ROM, or any combination of systems, methods, integrated circuits, computer programs, or recording media.

The present disclosure can realize an estimating method, etc., capable of accurately estimating the direction or position of a moving body including a living body relative to the estimating device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 is a table showing the conditions in the experiment using the estimating method according to Embodiment 2;

DETAILED DESCRIPTION OF THE EMBODIMENT

Underlying Knowledge Forming the Basis of the Present Disclosure

A method that uses radio signals is being considered as a method for knowing the position of a person.

For example, PTL 1 discloses a method for knowing the position or state of a person that is a detection target by analyzing a component that includes a Doppler shift, using Fourier transform. More specifically, the temporal change of an element of a complex transfer function is recorded, and the temporal waveform thereof is Fourier-transformed. A biological activity such as the respiration or heartbeat of a living body such as a person has a small Doppler effect on the reflected wave. Therefore, a component including a Doppler shift includes the influence of the person. On the other hand, a component that does not include a Doppler shift is a component that is not influenced by the person, that is, a component corresponding to a reflected wave from a fixed object or a direct wave between transmission and reception antennas. Based on this, PTL 1 discloses that it is possible to know the position or state of a person that is a detection target by analyzing a component that includes a Doppler shift.

Furthermore, PTL 2 discloses a method for knowing the position or state of a person that is a detection target, by using difference information of two complex transfer functions of two time points having a predetermined interval among complex transfer functions of a radio transceiver.

However, in the above-described methods in PTL 1 and 2, although the estimating device is configured using a transmitter and a receiver or a plurality of radio transceivers, there is no description regarding transmitter and receiver-derived frequency fluctuation such as clock frequency error between the transmitter and receiver, a frequency error in sampling clocks used in an AD converter and DA converter, or the like. In addition, when estimating the direction or position of a living body by handling complex transfer functions of a radio transceiver or time series data of information conforming to the complex transfer functions, the Doppler shift caused by a person and the clock frequency error cannot be distinguished.

Furthermore, although PTL 3 discloses a method of performing timing correction by sending a timer correction command between sensors, adjusting the phase of RF signals of a radio transceiver through commands is difficult. Furthermore, PTL 4 relates to a technique that targets acceleration sensors, and is thus difficult to apply to a radio transceiver.

Figure 3:
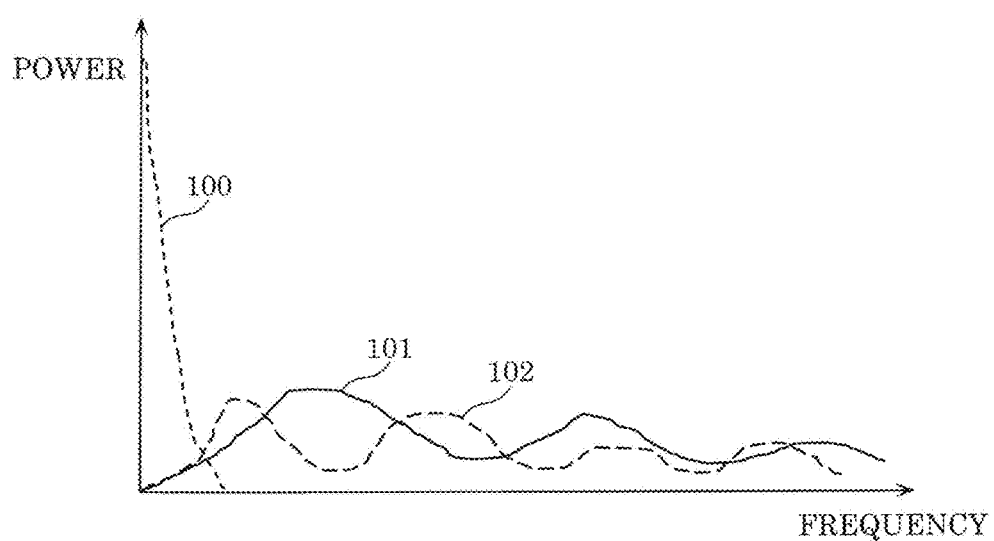
FIG. 3 is a conceptual diagram illustrating an example of frequency components of received I, Q signals according to Embodiment 1.

As a result of continued research on the above-described challenges, the inventors have found that, as illustrated in FIG. 3, reception signals include components such as transmission signal 100 transmitted from a transmission antenna, transmitter and receiver-derived frequency fluctuation 102, and living body-derived Doppler shift 101. Among them, it was found that the attenuation or phase rotation due to the propagation through space of transmission signal 100 has small frequency fluctuation, and that transmitter and receiver-derived frequency fluctuation and living body-derived Doppler shift frequency fluctuations are big. In addition, the inventors have found that the component difference per reception antenna is small for the attenuation or phase rotation due to the propagation through space of transmission signal 100 and the transmitter and receiver-derived frequency fluctuation, and the component difference per reception antenna is big for the living body-derived Doppler shift. This led to the finding of an estimating method capable of suppressing the transmitter and receiver-derived frequency fluctuation component and accurately estimating the direction or position, etc., in which a moving body is present relative to an estimating device by using radio signals even when a clock frequency error occurs between the transmitter and the receiver, by extracting one arbitrary element of the complex transfer functions, for example, and dividing each of the elements of the complex transfer functions by the extracted element which is a channel component of a direct wave included in the reception waves.

Specifically, an estimating method according to an aspect of the present disclosure is an estimating method for use in an estimating device that includes an antenna unit including a transmission antenna element and N reception antenna elements, where N is a natural number greater than or equal to two, the estimating method including: transmitting a transmission signal to a measurement target area using the transmission antenna element; measuring, for a first period equivalent to a cycle of movement by a moving body, reception signals which are received by each of the N reception antenna elements and include a reflected signal which is the transmission signal transmitted from the transmission antenna element that has been reflected by the moving body; calculating first complex transfer functions using the reception signals measured in the first period, the first complex transfer functions each indicating a propagation characteristic between the transmission antenna element and one of the N reception antenna elements; calculating second complex transfer functions from the first complex transfer functions by performing a predetermined arithmetic operation using one or more elements of the first complex transfer functions, the second complex transfer functions having reduced components corresponding to at least one of (1) clock fluctuation between (i) a transmission unit that generates the transmission signal transmitted from a transmission antenna unit and (ii) a reception unit; and (2) timing fluctuation in digital-to-analog conversion of the transmission signal or analog-to-digital conversion of the reception signals; extracting moving body information corresponding to a component related to the moving body by extracting the moving body information corresponding to a predetermined frequency range of the second complex transfer functions calculated; and estimating a direction in which the moving body is present relative to the estimating device, according to a predetermined arrival direction estimating method and using the moving body information.

Accordingly, since the direct wave component that did not pass the moving body is extracted from the reception signals, the phase rotation occurring due to frequency error is detected, and the clock fluctuation between the transmission unit and the reception unit and the phase rotation derived from frequency error are removed from the complex transfer functions, it is possible to accurately estimate the direction in which the moving body is present Furthermore, in the calculating of the second complex transfer functions, the second complex transfer functions may be calculated by extracting a single element from the first complex transfer functions and dividing each element of the first complex transfer functions by the single element extracted.

Furthermore, in the calculating of the second complex transfer functions, the second complex transfer functions may be calculated by calculating an average value of all of the elements of the first complex transfer functions and dividing each element of the first complex transfer functions by the average value calculated.

Furthermore, in the calculating of the second complex transfer functions, the second complex transfer functions may be calculated by calculating correlation matrices of the first complex transfer functions, calculating eigenvalues and eigenvectors by eigenvalue decomposition of the correlation matrices, multiplying a pair of the eigenvectors for which eigenvalues are largest with the first complex transfer functions to calculate a third complex transfer function which is a channel component of a direct wave, and dividing each element of the first complex transfer functions by the third complex transfer function.

Furthermore, in the calculating of the second complex transfer functions, the second complex transfer functions may be calculated by calculating a left singular vector and a right singular vector by singular value decomposition of the first complex transfer functions, and multiplying the left singular vector and the right singular vector with the first complex transfer functions to calculate a fourth complex transfer function which is a channel component of a direct wave, and dividing each element of the first complex transfer functions by the fourth complex transfer function.

Furthermore, the predetermined arrival direction estimating method may be based on one of MUltiple SIgnal Classification (MUSIC) method, beamformer method, or Capon method.

Furthermore, the reception signals may be orthogonal frequency-division multiplexing (OFDM) signals.

Furthermore, an estimating method according to another aspect of the present disclosure is an estimating method for use in an estimating device that includes a transmission antenna unit including M transmission antenna elements, and a reception antenna unit including N reception antenna elements, where M and N are each a natural number greater than or equal to two, the estimating method including: transmitting transmission signals to a measurement target area using the M transmission antenna elements; measuring, for a first period equivalent to a cycle of movement by a moving body, reception signals which are received by each of the N reception antenna elements and include reflected signals which are the transmission signals emitted from the M transmission antenna elements that have been reflected by the moving body; calculating first complex transfer functions using the reception signals measured in the first period, the first complex transfer functions each indicating a propagation characteristic between one of the M transmission antenna elements and one of the N reception antenna elements; calculating second complex transfer functions from the first complex transfer functions by performing a predetermined arithmetic operation using one or more elements of the first complex transfer functions, the second complex transfer functions having reduced components corresponding to at least one of (1) clock fluctuation between (i) a transmission unit that generates the transmission signals transmitted from the transmission antenna unit and (ii) a reception unit; and (2) timing fluctuation in digital-to-analog conversion of the transmission signals or analog-to-digital conversion of the reception signals; extracting moving body information corresponding to a predetermined frequency range of the second complex transfer functions calculated, to extract the moving body information corresponding to a component related to the moving body; and estimating a position in which the moving body is present relative to the estimating device, according to a predetermined arrival direction estimating method and using the moving body information.

Accordingly, since the direct wave component that did not pass the moving body is extracted from the reception signals, the phase rotation occurring due to frequency error is detected, and the clock fluctuation between the transmission unit and the reception unit and the phase rotation derived from frequency error are removed from the complex transfer functions, it is possible to accurately estimate the position in which the moving body is present Furthermore, in the calculating of the second complex transfer functions, the second complex transfer functions may be calculated by extracting a single element from the first complex transfer functions and dividing each element of the first complex transfer functions by the single element extracted.

Furthermore, in the calculating of the second complex transfer functions, the second complex transfer functions may be calculated by calculating an average value of all of the elements of the first complex transfer functions and dividing each element of the first complex transfer functions by the average value calculated.

Furthermore, in the calculating of the second complex transfer functions, the second complex transfer functions may be calculated by calculating correlation matrices of the first complex transfer functions, calculating eigenvalues and eigenvectors by eigenvalue decomposition of the correlation matrices, multiplying a pair of the eigenvectors for which eigenvalues are largest with the first complex transfer functions to calculate a third complex transfer function which is a channel component of a direct wave, and dividing each element of the first complex transfer functions by the third complex transfer function.

Furthermore, in the calculating of the second complex transfer functions, the second complex transfer functions may be calculated by calculating a left singular vector and a right singular vector by singular value decomposition of the first complex transfer function vectors, and multiplying the left singular vector and the right singular vector with the first complex transfer functions to calculate a fourth complex transfer function, and dividing each element of the first complex transfer functions by the fourth complex transfer function.

Furthermore, the predetermined arrival direction estimating method may be based on one of MUltiple SIgnal Classification (MUSIC) method, beamformer method, or Capon method.

Furthermore, the reception signals may be orthogonal frequency-division multiplexing (OFDM) signals.

Furthermore, an estimating device according to an aspect of the present disclosure includes: an antenna unit including a transmission antenna element and N reception antenna elements, where N is a natural number greater than or equal to two; a transmission unit that transmits a transmission signal to a measurement target area using the transmission antenna element; a reception unit that measures, for a first period equivalent to a cycle of movement by a moving body, reception signals which are received by each of the N reception antenna elements and include a reflected signal which is the transmission signal transmitted from the transmission antenna element that has been reflected by the moving body; a first complex transfer function calculator that calculates first complex transfer functions using the reception signals measured in the first period, the first complex transfer functions each indicating a propagation characteristic between the transmission antenna element and one of the N reception antenna elements; a second complex transfer function calculator that calculates second complex transfer functions from the first complex transfer functions by performing a predetermined arithmetic operation using one or more elements of the first complex transfer functions, the second complex transfer functions having reduced components corresponding to at least one of (1) clock fluctuation between (i) the transmission unit that generates the transmission signal transmitted from a transmission antenna unit and (ii) the reception unit; and (2) timing fluctuation in digital-to-analog conversion of the transmission signal or analog-to-digital conversion of the reception signals; a moving body information calculator that extracts moving body information corresponding to a component related to the moving body by extracting the moving body information corresponding to a predetermined frequency range of the second complex transfer functions calculated; and a direction estimation processor that estimates a direction in which the moving body is present relative to the estimating device, according to a predetermined arrival direction estimating method and using the moving body information.

It should be noted that these generic and specific aspects may be implemented using a system, a method, an integrated circuit, a computer program, or a computer-readable recording medium such as a CD-ROM, or any combination of systems, methods, integrated circuits, computer programs, or recording media.

Hereinafter, exemplary embodiments of the present disclosure will be described in detail with reference to the Drawings. It should be noted that each of the exemplary embodiments described hereinafter illustrate a specific example of the present disclosure. The numerical values, shapes, materials, elements, the arrangement and connection of the elements, steps, the processing order of the steps, etc., shown in the following exemplary embodiments are mere examples, and are therefore not intended to limit the present disclosure. Furthermore, among the elements in the following exemplary embodiments, elements not recited in any one of the independent claims defining the most generic concept of the present disclosure are described as optional elements making up a more preferable form. It should be noted that in the Specification and the Drawings, elements having substantially the same functional configuration are given the same numerical sign in order to omit overlapping descriptions.

Embodiment 1

Hereinafter, estimation of the direction of a moving body (living body), which is a detection target, by estimating device 10 according to Embodiment 1, using difference information of complex transfer functions measured at two different time points in a predetermined period will be described with reference to the drawings.

[Configuration of Estimating Device 10]

Figure 1:
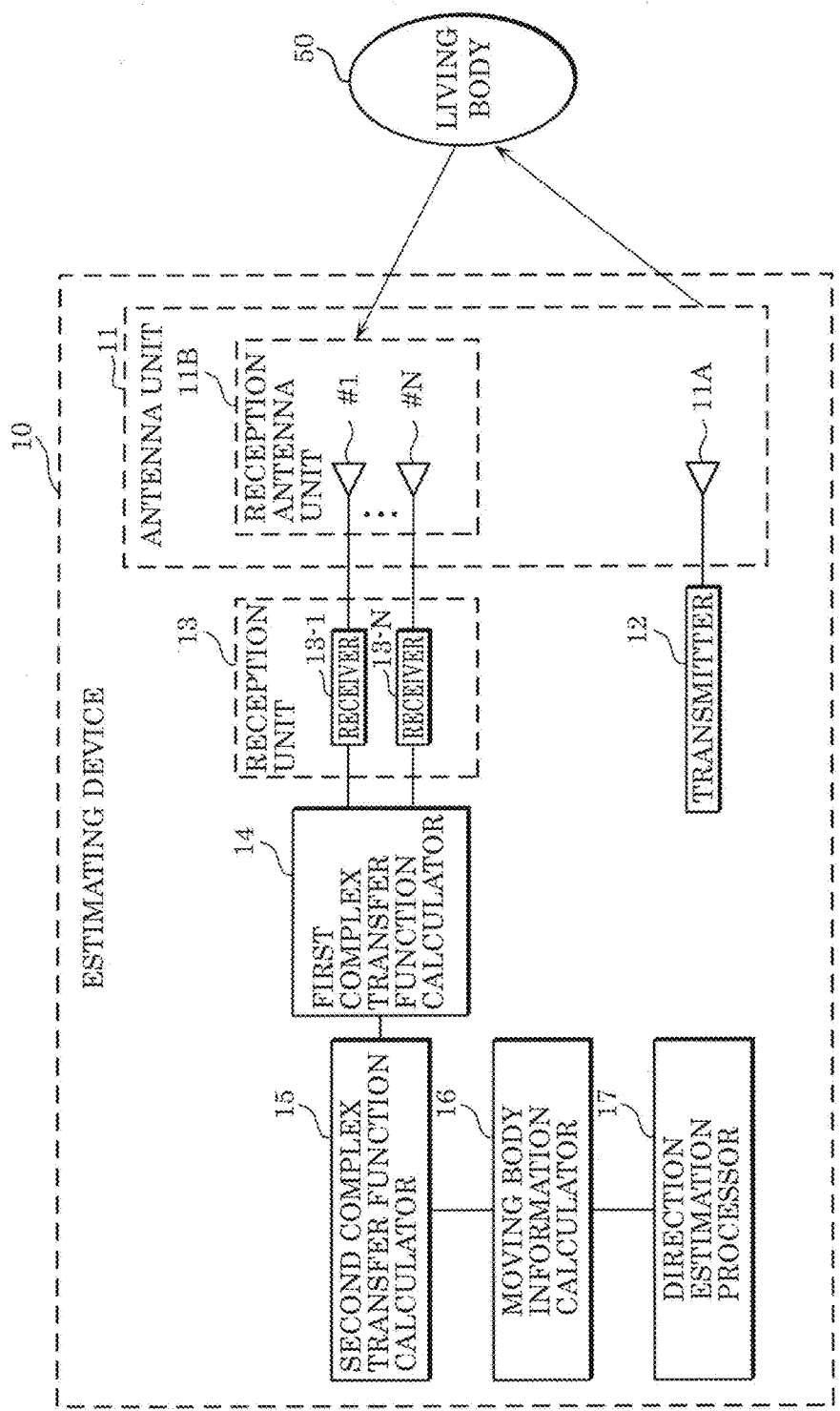
FIG. 1 is a block diagram illustrating an example of a configuration of an estimating device and a detection target according to Embodiment 1.

FIG. 1 is a block diagram illustrating an example of a configuration of estimating device 10 according to Embodiment 1. FIG. 1 also illustrates a living body which is the detection target of estimating device 10 illustrated in FIG. 1.

Estimating device 10 illustrated in FIG. 1 includes antenna unit 11, transmitter 12, reception unit 13, first complex transfer function calculator 14, second complex transfer function calculator 15, moving body information calculator 16, and direction estimation processor 17. Estimating device 10 estimates a direction in which a moving body is present relative to estimating device 10.

[Transmitter 12]

Figure 2:
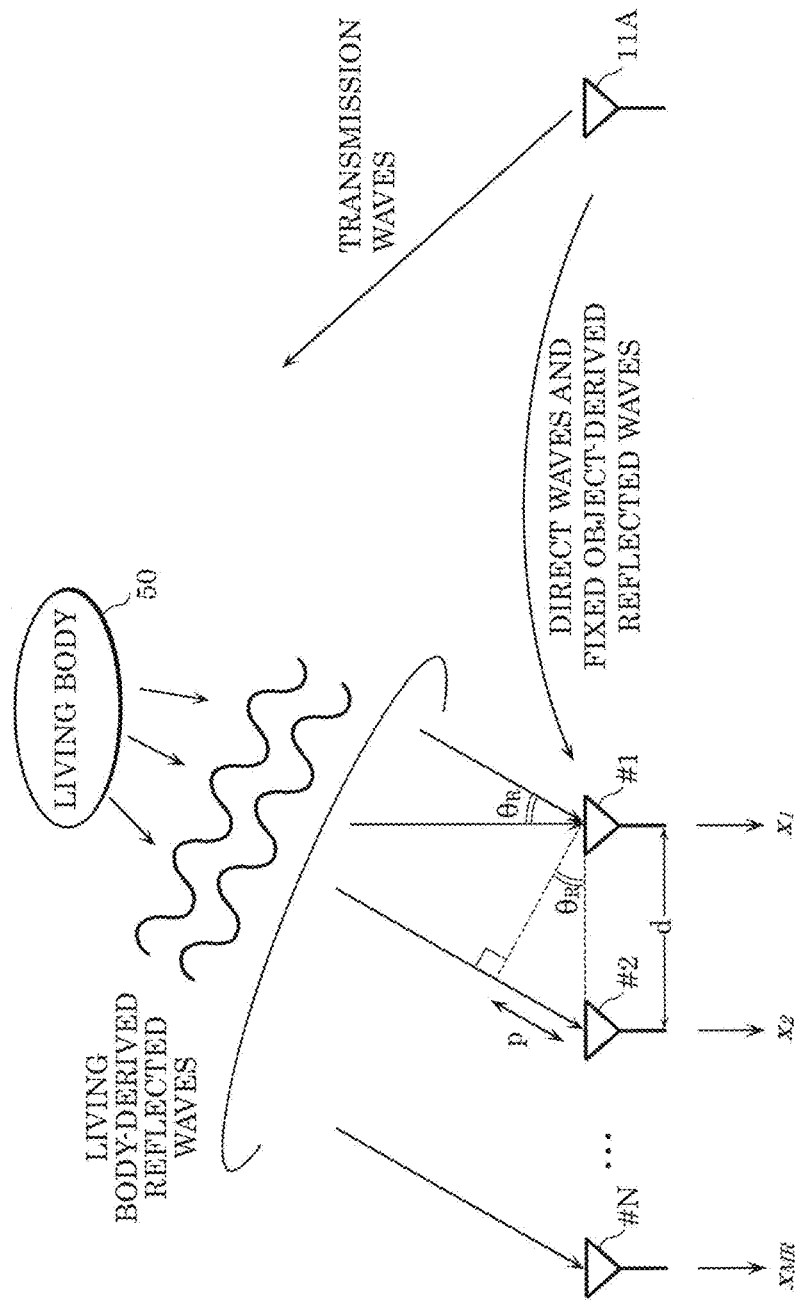
FIG. 2 is a diagram conceptually illustrating the transfer of signal waves of an antenna unit illustrated in FIG. 1.

Transmitter 12 generates a high-frequency signal to be used for estimating the direction of living body 50, using transmitter 12 internal clock fix. For example, as illustrated in FIG. 2, transmitter 12 transmits a generated signal (transmission wave) from a single transmission antenna element included in antenna unit 11.

[Antenna Unit 11]

Antenna unit 11 includes a single transmission antenna element and N (N is a natural number greater than or equal to two) reception antenna elements. In this embodiment, antenna unit 11 includes transmission antenna unit 11A and reception antenna unit 11B. Transmission antenna unit 11A includes a transmission antenna element which is a 1-element transmission antenna, and reception antenna unit 11B includes $M_R$ reception antenna elements (i.e., a reception array antenna).

As described above, the single transmission antenna element transmits the signal (transmission wave) generated by transmitter 12. Then, for example, as illustrated in FIG. 2, each of the $M_R$ reception antenna elements receive the signal that was transmitted by the single transmission antenna element and reflected by living body 50 (i.e., reception signal).

[Reception Unit 13]

Reception unit 13 measures, for a first period equivalent to a cycle derived from an activity of the moving body, reception signals which are received by each of the N reception antenna elements and include a reflected signal which is the signal transmitted from the transmission antenna element that has been reflected by the moving body. Here, the moving body is living body 50 illustrated in FIG. 2. Furthermore, the cycle derived from an activity of the moving body is a living body-derived cycle (living body fluctuation cycle) including at least one of respiration, heartbeat, and body motion of living body 50.

In this embodiment, reception unit 13 includes N ($M_R$) receivers (receiver 13-1 to receiver 13-N). Each of receiver 13-1 to receiver 13-N converts, using a receiver internal clock $f_{RX}$, the high-frequency signal received by a corresponding reception antenna element into a low-frequency signal on which signal processing can be performed. Reception unit 13 transmits the low-frequency signal converted by each of receiver 13-1 to receiver 13-N to first complex transfer function calculator 14 at least for the first period.

[First Complex Transfer Function Calculator 14]

First complex transfer function calculator 14 calculates, from the reception signals measured in the first period, a plurality of complex transfer functions indicating propagation characteristics between the transmission antenna element and one of the N reception antenna elements.

In this embodiment, first complex transfer function calculator 14 calculates, from the low-frequency signals transmitted from reception unit 13, complex transfer functions indicating the propagation characteristics between the single transmission antenna element and the $M_R$ reception antenna elements. More specific description will be carried out below with reference to FIG. 2.

FIG. 2 is a diagram conceptually illustrating the transfer of a signal wave of antenna unit 11 illustrated in FIG. 1. As illustrated in FIG. 2, the transmission wave transmitted from the transmission antenna element of transmission antenna unit 11A is reflected by living body 50 and reaches the reception array antenna of reception antenna unit 11B. Here, the reception array antenna includes $M_R$ reception antenna elements, and is a linear array having an element interval d. Furthermore, the direction of living body 50 as seen from the front of the reception array antenna is assumed to be θ. It is assumed that the distance between living body 50 and the reception array antenna is sufficiently large, and the living body-derived reflected waves arriving at the reception array antenna can be considered to be plane waves.

In this case, first complex transfer function calculator 14 can calculate first complex transfer function vectors indicating the propagation characteristics between the transmission antenna element and the reception array antenna, from the following complex reception signal vectors measured using the reception array antenna:

$$x=[x_1, \ldots, x_{M_R}]$$ [Math. 1]

First complex transfer function vectors $h_0$ can be calculated for example according to the equation below:

$$h_0=x/s$$ [Math. 2]

Here, s denotes a complex transmission signal, and is assumed to be known. It should be noted that first complex transfer function vectors $h_0$ is an example of first complex transfer functions.

[Second Complex Transfer Function Calculator 15]

Here, first complex transfer function vectors $h_0$ includes transmitter and receiver-derived frequency fluctuation components and a living body-derived Doppler shift. Transmitter and receiver-derived frequency fluctuation components include, for example, (i) attenuation or phase rotation due to propagation through space of the transmission signal, (ii) clock frequency error ($f_{RX}-f_{TX}$) between the transmitter and receiver, (iii) a frequency error in a sampling clock used in the radio transceiver, such as in DA conversion, and so on. In order to remove the phase rotation of the transmitter and receiver-derived frequency fluctuation components from first complex transfer function vectors $h_0$, second complex transfer function calculator 15 extracts, as a direct wave component, one arbitrary element $h_I$ among first complex transfer function vectors $h_0$.

[Math. 3]

$$h'=h_0/h_I \qquad \text{(Equation 1)}$$

Then, second complex transfer function calculator 15 calculates second complex transfer function vectors h' by dividing each of the elements of first complex transfer function vectors $h_0$ by element $h_I$ extracted as a direct wave component, as shown in Equation 1. Here, any element, such as element $h_1$, etc., may be used as the element of the direct wave component as long as it is one element of first complex transfer function vectors $h_0$. It should be noted that second complex transfer function vectors h' is an example of second complex transfer functions.

In this manner, second complex transfer function calculator 15 calculates second complex transfer function vectors h' from first complex transfer function vectors $h_0$ by performing a predetermined arithmetic operation using one or more elements of first complex transfer function vectors $h_0$; second complex transfer function vectors h' having reduced components corresponding to at least one of (1) the clock fluctuation between (i) transmitter 12 including a transmission unit that generates the transmission signal transmitted from transmission antenna unit 11A and (i) reception unit 13; and (2) timing fluctuation in the digital-to-analog conversion of the transmission signal or the analog-to-digital conversion of the reception signals.

[Moving Body Information Calculator 16]

Moving body information calculator 16 calculates the moving body information by calculating difference information between two second complex transfer function vectors h' at two time points having a predetermined interval, in the same manner as the error information calculator described in PTL 1, using the calculated second complex transfer function vectors h'. Specifically, moving body information calculator 16 extracts moving body information corresponding to a component related to the moving body, by extracting moving body information corresponding to a predetermined frequency range of the calculated plurality of second complex transfer function vectors h'. For example, moving body information calculator 16 extracts, as moving body information, moving body information corresponding to a component affected by vital activity including at least one of respiration, heartbeat, and body motion of the living body.

It goes without saying that, for this moving body information, it is sufficient that a living body-derived component be calculated from second complex transfer function vectors h', and the same effects can be obtained even when frequency response is used.

In this embodiment, since there are plural ($M_R$) reception antenna elements, the difference values (difference information) of second complex transfer function vectors h' corresponding to reception antenna unit 11B are also plural in number. These are collectively defined as a complex difference channel vector. If the number of reception antenna elements is set as $M_R$, the complex difference channel vector is represented as below.

[Math. 4]
$$h(l,m)=[h_1(l,m), \ldots , h_{M_R}(l,m)]^T$$ (Math. 4)

where $1 \leq l, m \leq N (l \neq m)$, and $N$ is the total number of measurements) [Math. 5]

Furthermore, each of l and m is a positive integer representing a measurement number, and is a sample time. It should be noted that transposition is represented as below.

[Math. 6]
$$[\cdot]^T$$ (Math. 6)

[Direction Estimation Processor 17]

Direction estimation processor 17 estimates the direction in which the moving body is present relative to estimating device 10, according to a predetermined arrival direction estimating method, using the moving body information extracted from second complex transfer function vectors h'. More specifically, the predetermined arrival direction estimating method may be an estimating method based on the MUltiple SIgnal Classification (MUSIC) algorithm as with the direction estimation processor described in PTL 1, or may be an estimating method based on the beamformer method or Capon method.

It should be noted that the signal transmitted from transmitter 12 may be a continuous wave signal (CW signal), or a coded signal such as an orthogonal frequency-division multiplexing (OFDM) signal.

[Other Examples of Direct Wave Component]

It should be noted that although second complex transfer function calculator 15 according to Embodiment 1 calculates second complex transfer function vectors h' by dividing first complex transfer function vectors $h_0$ by one arbitrary element $h_l$ among first complex transfer function vectors $h_0$, as a direct wave component, the divisor is not limited to one element $h_l$.

For example, for the direct wave component to be used in dividing first complex transfer function vectors $h_0$, element $h_{lmin}$ for which the temporal fluctuation of $|h_l|$ is smallest may be used instead of one arbitrary element $h_l$. Element $h_{lmin}$ is calculated using Equation 2 below, and second complex transfer function vectors h' are calculated by using the calculated element $h_{lmin}$ and Equation 3 below. As shown in Equation 2, the dispersion may calculated for the temporal change of each element of first complex transfer function vectors $h_0$, and the element for which the calculated dispersion is smallest may be calculated as $h_{lmin}$.

[Math. 7]
$$h_{lmin}=\min(E[(|h_l|-\overline{|h_l|})^2])$$ (Equation 2)

[Math. 8]
$$h'=h_0/h_{lmin}$$ (Equation 3)

Furthermore, for example, for the direct wave component to be used in dividing first complex transfer function vectors $h_0$, the average value of all the elements of first complex transfer function vectors $h_0$ may be used. Specifically, in this case, second complex transfer function calculator 15 calculates second complex transfer function vectors h' by dividing each of the elements of first complex transfer function vectors $h_0$ by the calculated average value.

Furthermore, for example, the direct wave component to be used in dividing may be calculated by measuring complex transfer functions for a certain period to obtain $h_0(t)$, performing singular value decomposition of the complex transfer functions of arbitrary time t, and using the singular vectors calculated according to Equation 4. With this, second complex transfer function vectors h' may be calculated as in Equation 5.

[Math. 9]
$$h_0(t)=U(t)\Sigma(t)V^H(t)$$ (Equation 4)

[Math. 10]
$$h'(t)=h_0(t)/(u_1^H h_0(t)v_1)$$ (Equation 5)

As shown in Equation 4, second complex transfer function calculator 15 calculates left singular vector U(t) and right singular vector V(t) by singular value decomposition of first complex transfer function vectors $h_0(t)$. Next, using the result of calculation according to Equation 4, second complex transfer function calculator 15 calculates second complex transfer function vectors h' by multiplying left singular vector U(t) and right singular vector V(t) with first complex transfer function vectors $h_0(t)$ to calculate fourth complex transfer function $u_1^H h_0(t) v_1$ which is the channel component of a direct wave, and dividing each of the elements of first complex transfer function vectors $h_0(t)$ by fourth complex transfer function $u_1^H h_0(t) v_1$, as shown in Equation 5.

Furthermore, for example, the direct wave component to be used in dividing may be calculated by measuring complex transfer functions for a certain period to obtain $h_0(t)$, performing eigenvalue decomposition of the correlation matrices for the entire measurement time, and using the eigenvectors calculated according to Equation 6 and Equation 7. With this, second complex transfer function vectors h' may be calculated as in Equation 8.

[Math. 11]

$$R_R = UDU^H \quad \text{(Equation 6)}$$

[Math. 12]

$$R_T = VDV^H \quad \text{(Equation 7)}$$

[Math. 13]

$$h'(t) = h_0(t)/(u_1^H h_0(t) v_1) \quad \text{(Equation 8)}$$

As shown in Equation 6 and Equation 7, second complex transfer function calculator 15 calculates correlation matrices $R_R$ and $R_T$ of first complex transfer function vectors $h_0(t)$, and calculates eigenvalues D, D and eigenvectors U, V by performing eigenvalue decomposition of each of calculated correlation matrices $R_R$ and $R_T$. Next, using the results of calculation according to Equation 6 and Equation 7, second complex transfer function calculator 15 calculates second complex transfer function vectors h' by multiplying a pair of eigenvectors $u^1$, $v^1$ for which eigenvalues D, D are largest with first complex transfer function vectors $h_0(t)$ to calculate third complex transfer function $u_1^H h_0(t) v_1$ which is the channel component of the direct wave, and dividing each of the elements of first complex transfer function vectors $h_0(t)$ by third complex transfer function $u_1^H h_0(t) v_1$, as shown in Equation 8.

It should be noted that the direct wave component may be calculated by performing eigenvector decomposition of the correlation matrices for the entire measuring time is performed, and using the eigenvectors calculated according to Equation 6 and Equation 7. With this, second complex transfer function vectors h' may be calculated as in Equation 9.

[Math. 14]

$$h'(t) = h_0(t) \Bigg/ \left( \frac{u_1^H h_0(t) v_1}{u_1^H h_0(t_1) v_1} \right) \quad \text{(Equation 9)}$$

It should be noted that transmitter 12, reception unit 13, first complex transfer function calculator 14, second complex transfer function calculator 15, moving body information calculator 16, and direction estimation processor 17 may be realized by one or more processors executing a program stored in a memory included in estimating device 10, or may be realized by one or more dedicated circuits. In other words, the above-mentioned elements may be realized by software, or may be realized by hardware.

[Operation of Estimating Device 10]

Figure 4:
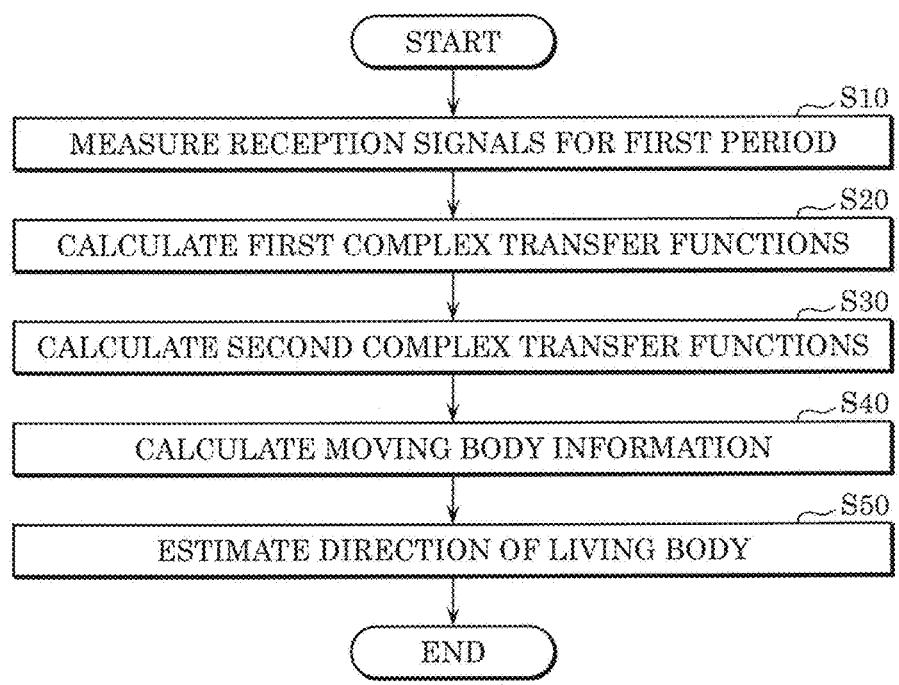
FIG. 4 is a flowchart illustrating an estimation process by the estimating device according to Embodiment 1.

The operation in the estimation processing by estimating device 10 configured in the above-described manner will be described. FIG. 4 is a flowchart illustrating estimation processing by estimating device 10 according to Embodiment 1.

First, estimating device 10 transmits a transmission signal to a measurement target area, and measures reception signals for a first period (S10). More specifically, estimating device 10 measures, for a first period equivalent to a cycle derived from an activity of living body 50, reception signals including a reflected signal which is a signal transmitted from a single transmission antenna element and reflected by living body 50.

Next, estimating device 10 calculates from the plurality of reception signals measured in the first period in step S10, a plurality of first complex transfer functions indicating propagation characteristics between the single transmission antenna element and each of $M_R$ reception antenna elements (S20). Since the details are as described above, description will be omitted here. The same applies for the following.

Next, estimating device 10 calculates second complex transfer functions by dividing the first complex transfer functions by a direct wave component (S30).

Next, estimating device 10 calculates pieces of moving body information from the second complex transfer functions (S40).

Then, estimating device 10 estimates the direction in which living body 50 is present, using two or more pieces of moving body information (S50).

[Effects, Etc.]

According to estimating device 10 and the estimating method according to this embodiment, a direct wave component that did not pass the living body is extracted from the reception signals, phase rotation occurring due to frequency error is detected, and clock fluctuation between the transmission unit and the reception unit and the phase rotation derived from frequency error are removed from the entire channel, and thus it is possible to accurately estimate the direction in which the moving body is present. As such, estimating device 10 is capable of accurately estimating the direction in which the living body is present relative to estimating device 10.

Embodiment 2

In Embodiment 1, the direct wave component that did not pass the living body is extracted from the reception signals, phase rotation occurring due to frequency error is detected, and the phase rotation derived from frequency error are removed from the entire channel, to thereby make it possible to accurately estimate the direction in which the moving body is present. Accordingly, estimating device 10, and so on, which estimates the direction in which a living body is present using radio signals has been described. In Embodiment 2, estimating device 20 which estimates the position of a moving body (living body) that is a detection target by likewise using a direct wave component will be described.

[Configuration of Estimating Device 20]

Figure 5:
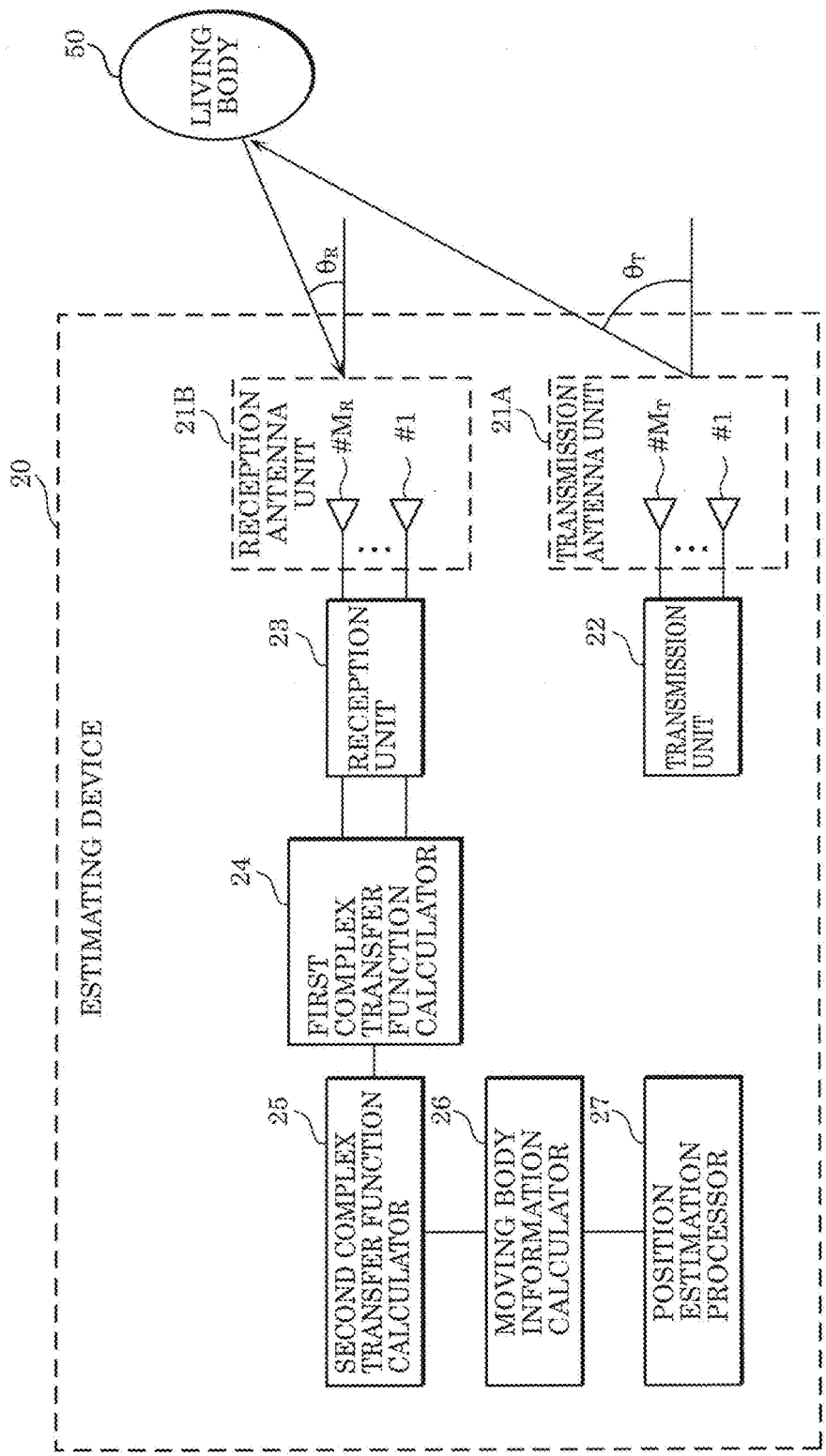
FIG. 5 is a block diagram illustrating an example of a configuration of an estimating device and a detection target according to Embodiment 2.

FIG. 5 is a block diagram illustrating an example of a configuration of estimating device 20 according to Embodiment 2. The same numerical reference is given to constituent elements that are the same as those in FIG. 1 and their detailed description shall be omitted. In Embodiment 2, unless stated otherwise, elements that are the same as in Embodiment 1 have the same operation and variations, and thus overlapping description will be omitted.

Estimating device 20 illustrated in FIG. 5 includes transmission antenna unit 21A, reception antenna unit 21B, transmission unit 22, reception unit 23, first complex transfer function calculator 24, second complex transfer calculator 25, moving body information calculator 26, and position estimation processor 27. Estimating device 20 estimates the position of a moving body. Compared to estimating device 10 illustrated in FIG. 1, estimating device 20 illustrated in FIG. 5 is at least different in terms of the number of reception antenna elements, and, because of this, is capable of estimating the position of a moving body.

[Transmission Unit 22]

Transmission unit 22 generates a high-frequency signal to be used for estimating the direction of living body 50, using transmitter 12 internal clock $f_{TX}$. For example, as illustrated in FIG. 5, transmission unit 22 transmits generated signals (transmission signals) from the $M_T$ transmission antenna elements (i.e., a transmission array antenna) included in transmission antenna unit 21A.

[Transmission Antenna Unit 21A]

Transmission antenna unit 21A includes M (M is a natural number greater than or equal to two) transmission antenna elements. In this embodiment, transmission antenna unit 21A includes $M_T$ transmission antenna elements. As described above, the $M_T$ transmission antenna element transmits the signal (transmission wave) generated by transmission unit 22.

[Reception Antenna Unit 21B]

Reception antenna unit 21B includes N (N is a natural number greater than or equal to two) reception antenna elements (i.e., a reception array antenna). In this embodiment, reception antenna unit 21B includes $M_R$ reception antenna elements (i.e., a reception array antenna) as in Embodiment 1. For example, as illustrated in FIG. 5, each of the $M_R$ reception antenna elements receive the signals that were transmitted by the $M_T$ transmission antenna elements (transmission array antenna) and reflected by living body 50 (i.e., reception signals).

[Reception Unit 23]

Reception unit 23 measures, for a first period equivalent to a cycle derived from an activity of the moving body, reception signals that are received by each of the N reception antenna elements and include reflected signals which are the signals transmitted from the M transmission antenna elements that have been reflected by the moving body. Here, the moving body is living body 50 illustrated in FIG. 5. Furthermore, the cycle derived from an activity of the moving body is a living body-derived cycle (living body fluctuation cycle) including at least one of respiration, heartbeat, and body motion of living body 50.

In this embodiment, reception unit 23 includes $M_R$ receivers. Each of the $M_R$ receivers converts the high-frequency signals received by the corresponding reception antenna elements into low-frequency signals on which signal processing can be performed. Reception unit 23 transmits the low-frequency signal converted by each of the $M_R$ receivers to first complex transfer function calculator 24 at least for the first period.

[First Complex Transfer Function Calculator 24]

First complex transfer function calculator 24 calculates, from the reception signals measured in the first period, a plurality of complex transfer functions indicating propagation characteristics between the each of M transmission antenna elements and each of the N reception antenna elements.

In this embodiment, first complex transfer function calculator 24 calculates, from the low-frequency signals transmitted from reception unit 23, complex transfer functions indicating the propagation characteristics between the $M_T$ transmission antenna elements and the $M_R$ reception antenna elements. More specific description will be carried out below with reference to FIG. 5.

In FIG. 5, both the transmission array antenna and the reception array antenna are linear arrays having element interval d, and the direction of living body 50 seen from the front of the transmission array antenna and the reception array antenna is assumed to be $\theta_T$ and $\theta_R$, respectively. The distance between living body 50 and the transmission array antenna is assumed to be sufficiently large compared to the opening width of the array antenna, and the signals transmitted from the transmission array antenna and arriving at the reception array antenna are considered to be plane waves.

As illustrated in FIG. 5, the transmission waves transmitted at an angle $\theta_T$ from the $M_T$ transmission antenna elements (transmission array antenna) of transmission antenna unit 21A are reflected by living body 50 and arrive at the reception array antenna at an angle $\theta_R$.

In this case, first complex transfer function calculator 24 can calculate the first complex transfer function vectors from the complex reception signal vectors measured using the reception array antenna. The first complex transfer function vectors are in matrix form but can be calculated in the same manner as in Embodiment 1. It should be noted that, as described previously, the calculated first complex transform function matrix includes direct waves and reflected waves not derived from living body 50 such as reflected waves derived from a fixed object.

[Second Complex Transfer Function Calculator 25]

Here, as in Embodiment 1, the first complex transfer functions include transmitter and receiver-derived frequency fluctuation components and a living body-derived Doppler shift. Second complex transfer function calculator 25 extracts, as the direct wave component, one arbitrary element $h_{kl}$ in first complex transfer function matrix $H_0$, and calculates second complex transfer function matrix H' by dividing first complex transfer function matrix $H_0$ shown in Equation 10 by the direct wave component as shown in Equation 11.

[Math. 15]

$$H_0 = \begin{pmatrix} h_{11} & \cdots & h_{1M_T} \\ \vdots & h_{kl} & \vdots \\ h_{M_R 1} & \cdots & h_{M_R M_T} \end{pmatrix} \quad \text{(Equation 10)}$$

[Math. 16]

$$H' = H_0 / h_{kl} \quad \text{(Equation 11)}$$

Here, any element, such as element $h_{11}$, etc., may be used as the element of the direct wave component as long as it is one element of first complex transfer function matrix $H_0$. Furthermore, another example of the direct wave component described in Embodiment 1 may be used.

In this manner, second complex transfer function calculator 25 calculates second complex transfer function matrix H' from first complex transfer function matrix $H_0$ by performing a predetermined arithmetic operation using one or more elements of first complex transfer function matrix $H_0$, second complex transfer function matrix H' having reduced components corresponding to at least one of (1) the clock fluctuation between (i) transmission unit 22 that generates the transmission signals transmitted from transmission antenna unit 21A and (ii) reception unit 23; and (2) timing fluctuation in the digital-to-analog conversion of the transmission signals or the analog-to-digital conversion of the reception signals.

[Moving Body Information Calculator 26]

Moving body information calculator 26 sequentially records the calculated second complex transfer function matrices H' in time series which is the order in which the plurality of reception signals are measured. Then, moving body information calculator 26 calculates two or more pieces of moving body information represented by a M×N dimensional matrix and indicating the difference between two complex transfer functions at two time points having a predetermined interval out of the second complex transfer function matrices H'. Here, the start points out of the two time points having a predetermined interval for each of the two or more pieces of difference information are different times. Furthermore, the predetermined interval may be approximately half the cycle derived from living body 50 (living body fluctuation cycle).

Specifically, moving body information calculator 26 extracts moving body information corresponding to a component related to the moving body, by extracting moving body information corresponding to a predetermined frequency range of the calculated plurality of second complex transfer function matrices H'. For example, moving body information calculator 26 extracts, as moving body information, moving body information corresponding to a component affected by vital activity including at least one of respiration, heartbeat, and body motion of the living body.

It should be noted that, although moving body information is calculated from the difference of two complex transfer functions here, it goes without saying that living-body derived components can be extracted using frequency response.

In this embodiment, the transmission antenna element and the reception antenna element are both plural in number. As such, the number of difference values (moving body information) of second complex transfer coefficients corresponding to transmission antenna unit 21A and reception antenna unit 21B is the number of transmission antenna elements times the number of reception antenna elements ($M_R \times M_T$), and the difference values are collectively defined as complex difference channel matrix H(l, m). Second complex transfer function calculator 25 calculates, as difference information, complex difference channel matrix H (l, m) expressed in Equation 11 below. Since all reflected waves that did not pass living body 50 are removed by a difference arithmetic operation, complex difference channel matrix H (l, m) includes only reflected waves derived from living body 50.

[Math. 17]

$$H(l, m) = \begin{pmatrix} h'_{11}(l, m) & \cdots & h'_{1M_T}(l, m) \\ \vdots & \ddots & \vdots \\ h'_{M_R 1}(l, m) & \cdots & h'_{M_R M_T}(l, m) \end{pmatrix} \quad \text{(Equation 12)}$$

Here, the relationship in Equation 13 holds.

[Math. 18]

$1 \leq l, m \leq N (l \neq m$, and $N$ is the total number of measurements) (Equation 13)

Furthermore, each of l and m is a positive integer representing a measurement number, and is a sample time.

[Position Estimation Processor 27]

Position estimation processor 27 estimates the position in which the moving body is present according to a predetermined arrival direction estimating method, using the moving body information extracted from second complex transfer function matrix H'. More specifically, the predetermined arrival direction estimating method may be an estimating method based on the MUltiple SIgnal Classification (MUSIC) algorithm as with the position estimation unit described in PTL 1, or may be an estimating method based on the beamformer method or Capon method.

It should be noted that transmission unit 22, reception unit 23, first complex transfer function calculator 24, second complex transfer function calculator 25, moving body information calculator 26, and position estimation processor 27 may be realized by one or more processors executing a program stored in a memory included in estimating device 20, or may be realized by one or more dedicated circuits. In other words, the above-mentioned elements may be realized by software, or may be realized by hardware.

[Operation of Estimating Device 20]

Figure 6:
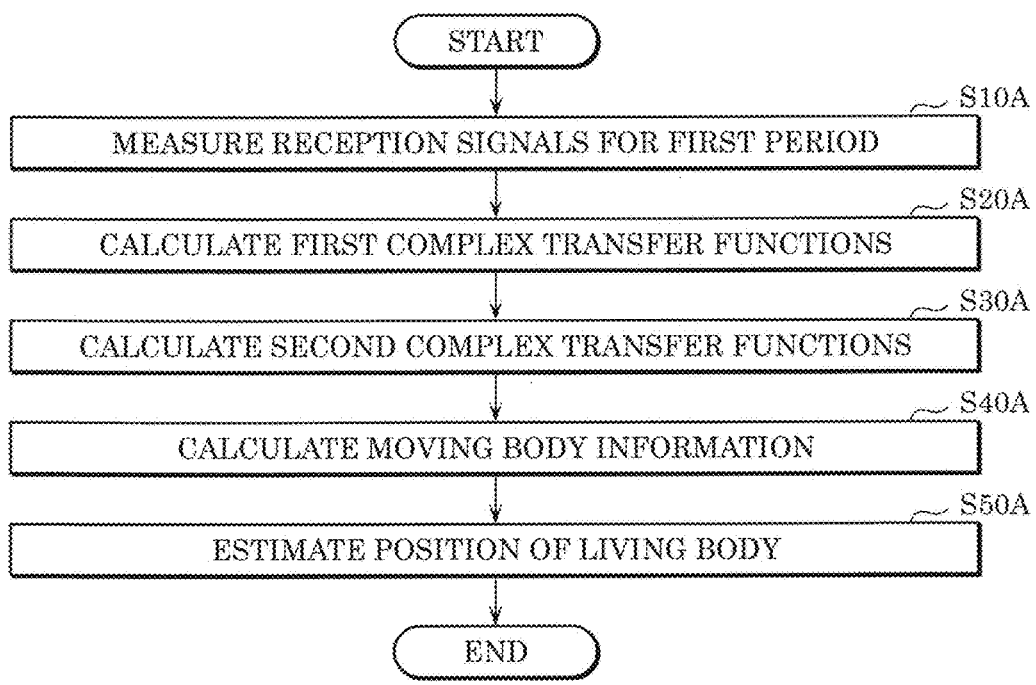
FIG. 6 is a flowchart illustrating an estimation process by the estimating device according to Embodiment 2.

The operation in the estimation processing by estimating device 20 configured in the above-described manner will be described. FIG. 6 is a flowchart illustrating estimation processing by estimating device 20 according to Embodiment 2.

First, estimating device 20 transmits transmission signals to a measurement target area, and measures reception signals for a first period (S10A). More specifically, estimating device 20 measures, for a first period equivalent to a cycle derived from an activity of living body 50, reception signals including reflected signals which are signals transmitted from the $M_T$ transmission antenna elements and reflected by living body 50.

Next, estimating device 20 calculates from the plurality of reception signals measured in the first period in step S10A, a plurality of first complex transfer functions indicating propagation characteristics between each of the $M_T$ transmission antenna elements and each of $M_R$ reception antenna elements (S20A). Since the details are as described above, description will be omitted here. The same applies for the following.

Next, estimating device 20 calculates second complex transfer functions by dividing the first complex transfer functions by a direct wave component (S30A).

Next, estimating device 20 calculates two or more pieces of moving body information indicating the difference between two complex transfer functions at two time points having a predetermined interval among the plurality of second complex transfer functions (S40A).

Then, estimating device 20 estimates the position in which living body 50 is present, using two or more pieces of moving body information (S50A).

[Effects, Etc.]

According to estimating device 20 and the estimating method according to this embodiment, a direct wave component that did not pass the living body is extracted from the reception signals, phase rotation occurring due to frequency error is detected, and clock fluctuation between the transmission unit and the reception unit and the phase rotation derived from frequency error are removed from the entire channel, and thus it is possible to accurately estimate the position in which the moving body is present.

Here, evaluation according to an experiment for verifying the advantageous effects according to Embodiment 2 has been performed. The experiment is described below.

(Experiment)

Figure 7:
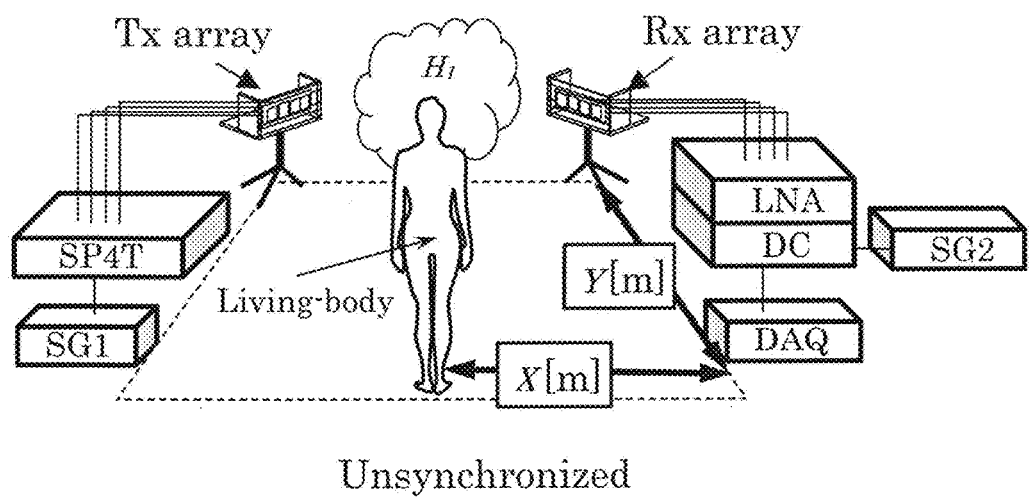
FIG. 7 is a diagram illustrating the concept of an experiment using the estimating method according to Embodiment 2.

FIG. 7 is a diagram illustrating the concept of an experiment using the estimating method according to Embodiment 2. FIG. 8 is a diagram illustrating the conditions in the experiment using the estimating method according to Embodiment 2.

Both the transmission array antenna (Tx array) and the reception array antenna (Rx array) illustrated in FIG. 7 have a 4×4 Multiple Input Multiple Output (MIMO) configuration using a 4 element patch array antenna. Furthermore, a Single-Pole-4-Throw (SP4T) switch is used on the transmission side, and a 4-line receiver is used on the reception side. Moreover, in this experiment, MIMO channel measurement was carried out using these devices.

Here, as illustrated in FIG. 8, the transmission/reception antenna array element interval was set to 0.5 wavelengths, transmission-reception distance D was set to 4.0 m, antenna height h was set to 1.0 m which is the height of the chest of a person (living body) when standing. A 2.47125 GHz non-modulated continuous wave (CW) was transmitted from the transmitter, and the channel measurement time was 33 seconds. During channel measurement, there were no people other than the subject, and the subject was facing the wall on the antenna side.

Figure 9:
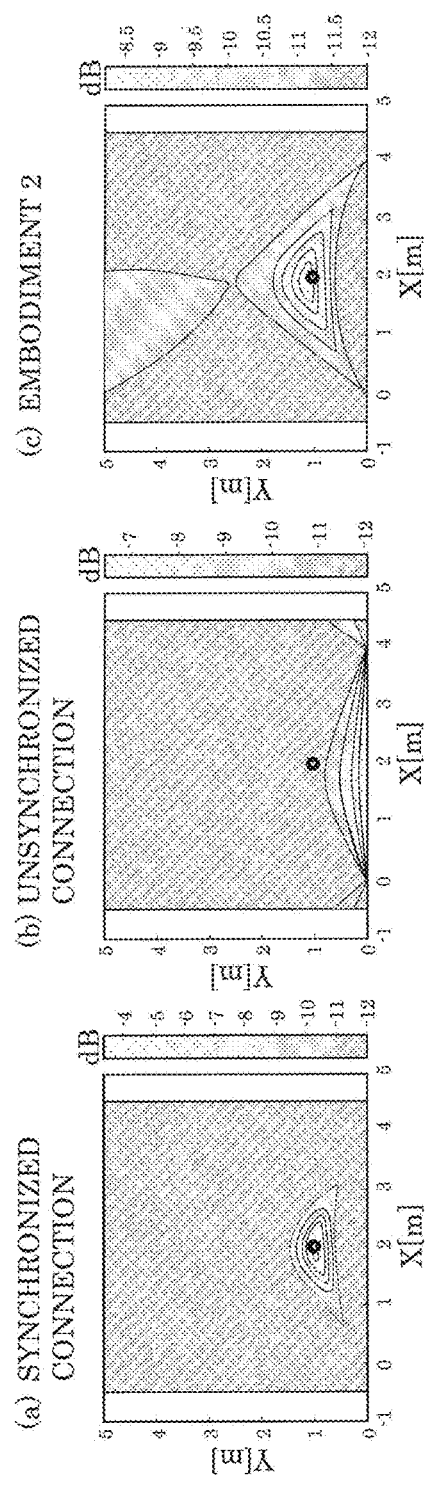
FIG. 9 is a diagram illustrating the results of the experiment using the estimating method according to Embodiment 2.

FIG. 9 is a diagram illustrating the results of the experiment using the estimating method according to Embodiment 2. Here, (a) in FIG. 9 illustrates the result of measuring with synchronized connection of the transmitter and receiver clocks, (b) in FIG. 9 illustrates the result of measuring without synchronized connection of the transmitter and receiver clocks, and (c) in FIG. 9 illustrates the result of measuring without synchronized connection of the transmitter and receiver clocks and applying the method in Embodiment 2. In FIG. 9, the results for living body position estimation in the case where the subject is one person. The position where subject 1 stood during the experiment was (X=2.0 m, Y=1.0 m). In FIG. 9, the actual position of the subject is indicated by a mark, and the evaluation function is indicated by dot sparseness/density gradation. In FIG. 9, the value of the evaluation function is represented in such a way that the bigger the value, the sparser the dots. It can be seen from (c) in FIG. 9 that, according to the estimating method according to Embodiment 2, living body position estimation for a person is possible even without synchronized connection of clocks between the transmitter and the receiver.

Figure 10:
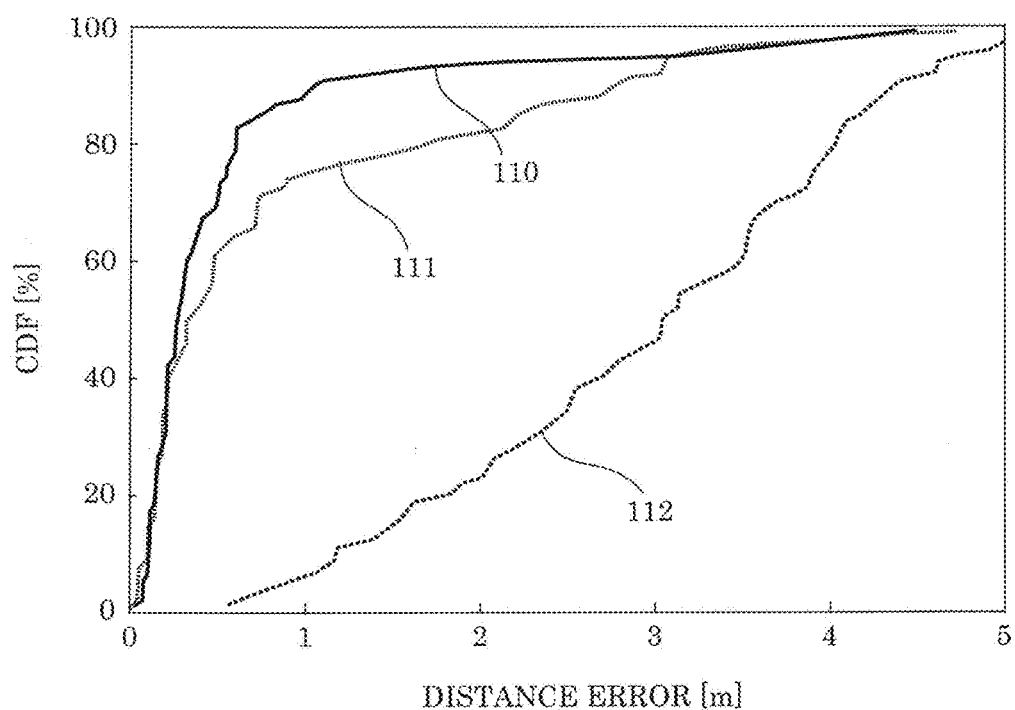
FIG. 10 is a graph illustrating other results of the experiment using the estimating method according to Embodiment 2.

FIG. 10 is a diagram illustrating other results of the experiment using the estimating method according to Embodiment 2. FIG. 10 illustrates the cumulative distribution function (CDF) of position estimation error in the case where the subject is a single person. In FIG. 10, solid line 110 indicates the result of measurement with synchronized connection of clocks between the transmitter and the receiver, dotted line 111 indicates the result of measurement without synchronized connection of clocks between the transmitter and receiver, using the method according to Embodiment 2, and broken line 112 indicates the result of measurement using a conventional method without synchronized connection of clocks between the transmitter and receiver.

According to FIG. 10, the CDF value for a position error of 1 m is 90% in the result for the case of no synchronized connection indicated by solid line 110, 75% in the result for Embodiment 2 indicated by dotted line 111, and 10% in the result for the conventional method without synchronized connection indicated by broken line 112. Therefore, it can be seen that the estimating method according to Embodiment 2 is capable of more accurate estimation when there is no synchronized connection of clocks between the transmitter and the receiver than the conventional method. This shows that, according to this embodiment, living body position can be estimated with high accuracy even without synchronized connection of clocks between the transmitter and the receiver.

As described above, according to the present disclosure, a direct wave component that did not pass the living body is extracted from the reception signals, phase rotation occurring due to frequency error is detected, and clock fluctuation between the transmission unit and the reception unit and the phase rotation derived from frequency error are removed from the entire channel, and thus it is possible to accurately estimate the position in which the moving body is present.

Although an estimating device and an estimating method according to an aspect of the present disclosure has been described up to this point based on exemplary embodiments, the present disclosure is not limited to these exemplary embodiments. Various modifications to the exemplary embodiments that can be conceived by a person of ordinary skill in the art or forms obtained by combining structural components of different exemplary embodiments, for as long as they do not depart from the essence of the present disclosure, are included in the scope of the present disclosure.

For example, although direction estimation and position estimation of living body 50 are described as examples in Embodiments 1 and 2, the target of the estimation process is not limited to living body 50. The target of the estimation process in the case where a high-frequency signal is emitted may be various moving bodies (machines, etc.) whose activity or movement has a Doppler effect on the reflected wave.

It should be noted that although in each of the foregoing embodiments, the respective elements are configured using dedicated hardware, the respective elements may be implemented by executing software programs suitable for the respective elements. The respective elements may be implemented by a program executer such as a CPU or a processor reading and executing a software program recorded on a recording medium such as a hard disk or a semiconductor memory. Here, the software for realizing the estimation device, etc., in each of the foregoing embodiments is a program such as that described below.

Specifically, the program causes a computer to execute an estimating method for use in an estimating device that includes an antenna unit including a transmission antenna element and N reception antenna elements, where N is a natural number greater than or equal to two, the estimating method including: transmitting a transmission signal to a measurement target area using the transmission antenna element; measuring, for a first period equivalent to a cycle of movement by a moving body, reception signals which are received by each of the N reception antenna elements and include a reflected signal which is the transmission signal transmitted from the transmission antenna element that has been reflected by the moving body; calculating first complex transfer functions using the reception signals measured in the first period, the first complex transfer functions each indicating a propagation characteristic between the transmission antenna element and one of the N reception antenna elements; calculating second complex transfer functions from the first complex transfer functions by performing a predetermined arithmetic operation using one or more elements of the first complex transfer functions, the second complex transfer functions having reduced components corresponding to at least one of (1) clock fluctuation between (i) a transmission unit that generates the transmission signal transmitted from a transmission antenna unit and (ii) a reception unit; and (2) timing fluctuation in digital-to-analog conversion of the transmission signal or analog-to-digital conversion of the reception signals; extracting moving body information corresponding to a component related to the moving body by extracting the moving body information corresponding to a predetermined frequency range of the second complex transfer functions calculated; and estimating a direction in which the moving body is present relative to the estimating device, according to a predetermined arrival direction estimating method and using the moving body information.

Furthermore, the program causes a computer to execute an estimating method for use in an estimating device that includes a transmission antenna unit including M transmission antenna elements, and a reception antenna unit including N reception antenna elements, where M and N are each a natural number greater than or equal to two, the estimating method including: transmitting transmission signals to a measurement target area using the M transmission antenna elements; measuring, for a first period equivalent to a cycle of movement by a moving body, reception signals which are received by each of the N reception antenna elements and include reflected signals which are the transmission signals emitted from the M transmission antenna elements that have been reflected by the moving body; calculating first complex transfer functions using the reception signals measured in the first period, the first complex transfer functions each indicating a propagation characteristic between one of the M transmission antenna elements and one of the N reception antenna elements; calculating second complex transfer functions from the first complex transfer functions by performing a predetermined arithmetic operation using one or more elements of the first complex transfer functions, the second complex transfer functions having reduced components corresponding to at least one of (1) clock fluctuation between (i) a transmission unit that generates the transmission signals transmitted from the transmission antenna unit and (ii) a reception unit; and (2) timing fluctuation in digital-to-analog conversion of the transmission signals or analog-to-digital conversion of the reception signals; extracting moving body information corresponding to a predetermined frequency range of the second complex transfer functions calculated, to extract the moving body information corresponding to a component related to the moving body; and estimating a position in which the moving body is present relative to the estimating device, according to a predetermined arrival direction estimating method and using the moving body information.

Although estimating devices and estimating methods according to one or more aspects are described thus far based on the foregoing embodiments, the present disclosure is not limited to the foregoing embodiments. Various modifications to exemplary embodiments that can be conceived by a person of ordinary skill in the art or those forms obtained by combining elements in the different embodiments, for as long as they do not depart from the essence of the present disclosure, may be included in the scope of the present disclosure.

INDUSTRIAL APPLICABILITY

The present disclosure can be used in an estimating device that estimates the direction or position of a moving body using radio signals, and can be used particularly in an estimating device provided in a measuring device that measures the direction or position of a moving body including a living body and a machine, a household appliance that performs control according to the direction or position of a moving body, a monitoring device that detects incursion of a moving body, and so on.

What is claimed is:

1. An estimating method for use in an estimating device that includes an antenna including a transmission antenna element and N reception antenna elements, where N is a natural number greater than or equal to two,
the estimating method comprising: transmitting a transmission signal to a measurement target area using the transmission antenna element;
measuring, for a first period equivalent to a cycle of movement according to an activity of a living body, reception signals which are received by each of the N reception antenna elements and include a reflected signal which is the transmission signal transmitted from the transmission antenna element that has been reflected by the living body;
calculating a first complex transfer function vector using the reception signals measured in the first period, the first complex transfer function vector indicating propagation characteristics between the transmission antenna element and the N reception antenna elements, the first complex transfer function vector having elements each of which indicates a different one of the propagation characteristics;
calculating a second complex transfer function vector from the first complex transfer function vector by performing a predetermined arithmetic operation using one or more of the elements of the first complex transfer function vector, the second complex transfer function vector having reduced elements corresponding to at least one of (1) clock fluctuation between (i) a transmitter that generates the transmission signal transmitted from a transmission antenna and (ii) a receiver; and (2) timing fluctuation in digital-to-analog conversion of the transmission signal or analog-to-digital conversion of the reception signals;
extracting living body information corresponding to a component related to the living body by extracting the living body information corresponding to a predetermined frequency range of the second complex transfer function vector calculated; and
estimating a direction in which the living body is present relative to the estimating device, according to a predetermined arrival direction estimating method and using the living body information.

2. The estimating method according to claim 1, wherein in the calculating of the second complex transfer function vector, the second complex transfer function vector is calculated by extracting a single element from the first complex transfer function vector and dividing each element of the first complex transfer function vector by the single element extracted.

3. The estimating method according to claim 1, wherein in the calculating of the second complex transfer function vector, the second complex transfer function vector is calculated by calculating an average value of all of the elements of the first complex transfer function vector and dividing each element of the first complex transfer function vector by the average value calculated.

4. The estimating method according to claim 1, wherein in the calculating of the second complex transfer function vector, the second complex transfer function vector is calculated by calculating correlation matrices of the first complex transfer function vector, calculating eigenvalues and eigenvectors by eigenvalue decomposition of the correlation matrices, multiplying a pair of the eigenvectors for which eigenvalues are largest with the first complex transfer function vector to calculate a third complex transfer function vector, which is a channel component of a direct wave, and dividing each element of the first complex transfer function vector by the third complex transfer function vector.

5. The estimating method according to claim 1, wherein in the calculating of the second complex transfer function vector, the second complex transfer function vector is calculated by calculating a left singular vector and a right singular vector by singular value decomposition of the first complex transfer function vector, and multiplying the left singular vector and the right singular vector with the first complex transfer function vector to calculate a fourth complex transfer function vector, which is a channel component of a direct wave, and dividing each element of the first complex transfer function vector by the fourth complex transfer function vector.

6. The estimating method according to claim 1, wherein the predetermined arrival direction estimating method is based on one of MUltiple SIgnal Classification (MUSIC) method, beamformer method, or Capon method.

7. The estimating method according to claim 6, wherein the reception signals are orthogonal frequency-division multiplexing (OFDM) signals.

8. An estimating method for use in an estimating device that includes a transmission antenna including M transmission antenna elements, and a reception antenna including N reception antenna elements, where M and N are each a natural number greater than or equal to two, the estimating method comprising:
transmitting transmission signals to a measurement target area using the M transmission antenna elements;
measuring, for a first period equivalent to a cycle of movement according to an activity of a living body, reception signals which are received by each of the N reception antenna elements and include reflected signals, which are the transmission signals emitted from the M transmission antenna elements that have been reflected by the living body;
calculating a first complex transfer function vector using the reception signals measured in the first period, the first complex transfer function vector indicating propagation characteristics between the M transmission antenna elements and the N reception antenna elements, the first complex transfer function vector having elements each of which indicates a different one of the propagation characteristics;
calculating a second complex transfer function vector from the first complex transfer function vector by performing a predetermined arithmetic operation using one or more of the elements of the first complex transfer function vector, the second complex transfer function vector having reduced elements corresponding to at least one of (1) clock fluctuation between (i) a transmitter that generates the transmission signals transmitted from the transmission antenna, and (ii) a receiver; and (2) timing fluctuation in digital-to-analog conversion of the transmission signals or analog-to-digital conversion of the reception signals;
extracting living body information corresponding to a predetermined frequency range of the second complex transfer function vector calculated, to extract the living body information corresponding to a component related to the living body; and
estimating a position in which the living body is present relative to the estimating device, according to a predetermined arrival direction estimating method and using the living body information.

9. The estimating method according to claim 8, wherein in the calculating of the second complex transfer function vector, the second complex transfer function vector is calculated by extracting a single element from the first complex transfer function vector and dividing each element of the first complex transfer function vector by the single element extracted.

10. The estimating method according to claim 8, wherein in the calculating of the second complex transfer function vector, the second complex transfer function vector calculated by calculating an average value of all of the elements of the first complex transfer function vector and dividing each element of the first complex transfer function vector by the average value calculated.

11. The estimating method according to claim 8, wherein in the calculating of the second complex transfer function vector, second complex transfer function vector is calculated by calculating correlation matrices of the first complex transfer function vector, calculating eigenvalues and eigenvectors by eigenvalue decomposition of the correlation matrices, multiplying a pair of the eigenvectors for which eigenvalues are largest with the first complex transfer function vector to calculate a third complex transfer function vector, which is a channel component of a direct wave, and dividing each element of the first complex transfer function vector by the third complex transfer function vector.

12. The estimating method according to claim 8, wherein in the calculating of the second complex transfer function vector, the second complex transfer function vector calculated by calculating a left singular vector and a right singular vector by singular value decomposition of the first complex transfer function vector, and multiplying the left singular vector and the right singular vector with the first complex transfer function vector to calculate a fourth complex transfer function vector, and dividing each element of the first complex transfer function vector by the fourth complex transfer function vector.

13. The estimating method according to claim 8, wherein the predetermined arrival direction estimating method is an estimating method based on one of MUltiple SIgnal Classification (MUSIC) method, beamformer method, or Capon method.

14. The estimating method according to claim 13, wherein the reception signals are orthogonal frequency-division multiplexing (OFDM) signals.

15. An estimating device, comprising:
an antenna including a transmission antenna element and N reception antenna elements, where N is a natural number greater than or equal to two;
a transmitter that transmits a transmission signal to a measurement target area using the transmission antenna element;
a receiver that measures, for a first period equivalent to a cycle of movement by a living body, reception signals which are received by each of the N reception antenna elements and include a reflected signal which is the transmission signal transmitted from the transmission antenna element that has been reflected by the living body;
a first complex transfer function calculator that calculates a first complex transfer function vectors using the reception signals measured in the first period, the first complex transfer function vector each indicating propagation characteristics between the transmission antenna element and one N reception antenna elements, the first complex transfer function vector having elements each of which indicates a different one of the propagation characteristics;
a second complex transfer function calculator that calculates a second complex transfer function vector from the first complex transfer function vector by performing a predetermined arithmetic operation using one or more of the elements of the first complex transfer function vector, the second complex transfer function vector having reduced elements corresponding to at least one of (1) clock fluctuation between (i) the transmitter that generates the transmission signal transmitted from a transmission antenna, and (ii) the receiver; and (2) timing fluctuation in digital-to-analog conversion of the transmission signal or analog-to-digital conversion of the reception signals;

a living body information calculator that extracts living body information corresponding to a component related to the living body by extracting the living body information corresponding to a predetermined frequency range of the second complex transfer function vector calculated; and a direction estimation processor that estimates a direction in which the living body is present relative to the estimating device, according to a predetermined arrival direction estimating method and using the living body information.

16. A non-transitory computer-readable recording medium having recorded thereon a program for causing a computer to execute an estimating method for use in an estimating device that includes an antenna including a transmission antenna element and N reception antenna elements, where N is a natural number greater than or equal to two, wherein the estimating method includes:

transmitting a transmission signal to a measurement target area using the transmission antenna element;

measuring, for a first period equivalent to a cycle of movement by a living body, reception signals which are received by each of the N reception antenna elements and include a reflected signal which is the transmission signal transmitted from the transmission antenna element that has been reflected by the living body;

calculating a first complex transfer function vector using the reception signals measured in the first period, the first complex transfer function vector indicating propagation characteristics between the transmission antenna element and one of the N reception antenna elements;

calculating a second complex transfer function vector from the first complex transfer function vector by performing a predetermined arithmetic operation using one or more of the elements of the first complex transfer function vector, the second complex transfer function vector having reduced components corresponding to at least one of (1) clock fluctuation between (i) a transmitter that generates the transmission signal transmitted from a transmission antenna, and (ii) a receiver; and (2) timing fluctuation in digital-to-analog conversion of the transmission signal or analog-to-digital conversion of the reception signals;

extracting living body information corresponding to a component related to the living body by extracting the living body information corresponding to a predetermined frequency range of the second complex transfer functions calculated; and estimating a direction in which the living body is present relative to the estimating device, according to a predetermined arrival direction estimating method and using the living body information.

\* \* \* \* \*

UNITED STATES PATENT AND TRADEMARK OFFICE
CERTIFICATE OF CORRECTION

| | |
|---|---|
| PATENT NO. | : 11,561,279 B2 |
| APPLICATION NO. | : 16/707323 |
| DATED | : January 24, 2023 |
| INVENTOR(S) | : Takeshi Nakayama et al. |

It is certified that error appears in the above-identified patent and that said Letters Patent is hereby corrected as shown below:

In the Claims

In Column 24, Line 11 (Claim 11, Line 3), the expression "vector, second" should read -- vector, the second --.

Signed and Sealed this
Fourth Day of April, 2023

Katherine Kelly Vidal
*Director of the United States Patent and Trademark Office*